3,787,568
ARTHRITIC COMPOSITIONS COMPRISING AN S-(PHOSPHINO- OR PHOSPHITOAUROUS)-THIOURONIUM HALIDE AND METHOD OF PRODUCING ANTI-ARTHRITIC ACTIVITY
Blaine M. Sutton, Hatboro, and Joseph Weinstock, Phoenixville, Pa., assignors to Smithkline Corporation, Philadelphia, Pa.
No Drawing. Filed May 1, 1972, Ser. No. 249,280
Int. Cl. A61k 27/00
U.S. Cl. 424—211          17 Claims

ABSTRACT OF THE DISCLOSURE

Pharmaceutical compositions having anti-arthritic activity comprising an S-(phosphino- or phosphitoaurous)-thiouronium halide and methods of producing anti-arthritic activity by administering internally, preferably orally, said compositions.

---

This invention relates to novel pharmaceutical compositions having anti-arthritic activity and to methods of producing anti-arthritic activity by administering said compositions. More specfically the compositions of this invention comprise an S-(phosphino- or phosphitoaurous)-thiouronium halide as the active medicament.

Gold salts have been known for many years to have anti-arthritic activity. However, their utility is limited by the requirement that they be administered only by the parenteral route. The compositions of this invention have distinct advantages in that they are active when administered by the oral route.

The novel pharmaceutical compositions of this invention, in dosage unit form, comprise a nontoxic pharmaceutical carrier and an S-(phosphino- or phosphitoaurous)-thiouronium halide represented generally by the following structural formula:

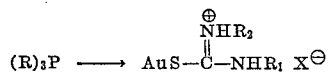

wherein:

R represents lower alkyl, phenyl, lower alkoxy or phenoxy, with the lower alkyl and lower alkoxy moieties being straight or branched chain of from 1 to 3 carbon atoms;

$R_1$ represents hydrogen or amino;
$R_2$ represents hydrogen or methyl; and
X represents chloro, bromo or iodo, preferably chloro.

The compounds of Formula I above are either known or are prepared by methods known in the literature. For example, reaction of a thiourea or thiosemicarbazide with a phosphine or phosphite gold halide in a nonreactive organic solvent such as ethanol at reflux temperature for from 30 to 90 minutes gives the corresponding S-(phosphino- or phosphitoaurous)-thiouronium halide. Reference may be made to Australian J. Chem., 19, 539 (1966).

The phosphine or phosphite gold halides employed as described above are prepared as follows. For example, a solution of thiodiglycol in a nonreactive organic solvent is mixed with an aqueous solution of gold acid chloride trihydrate, cooled to a temperature of from —10° to —5° C. and then the solution is reacted with an appropriate phosphine or phosphite to give the corresponding phosphine or phosphite gold chlorides. Reference may be made also to J. Chem. Soc., 1828 (1937) and 1235 (1940); Australian J. Chem., 19, 547 (1966).

The anti-arthritic activity of the compositions of this invention is measured by the ability of the active medicament to inhibit adjuvant-induced polyarthritis in rats. The active medicaments of Formula I produce marked inhibition of the development of adjuvant arthritis in rats at daily oral doses as low as 20 mg. (calculated on gold content) per kilogram of body weight. Adjuvant arthritis in rats is produced by a single injection of 0.75 mg. of Mycobacterium butyricum suspended in white paraffin (N.F.) into a hindpaw (left footpad). The injected paw becomes inflamed and reaches a maximum volume in 3-5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the dose described above beginning on the day of adjuvant injection and continuing for 17 days, thereafter, exclusive of days 4, 5, 11 and 12 protect the animals against development of both primary and secondary lesions of adjuvant arthritis.

The pharmaceutical compositions of this invention are prepared in conventional dosage unit forms by incorporating an amount of a compound of Formula I sufficient to produce anti-arthritic activity with a nontoxic pharmaceutical carrier according to accepted procedures. Preferably the compositions will contain an S-(phosphino- or phosphitoaurous)-thiouronium halide of Formula I in an amount of from about 1 mg. to about 25 mg., calculated on gold content, per dosage unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqeous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method in accordance with this invention comprises administering internally to an animal organism an S-(phosphino- or phosphitoaurous)-thiouronium halide of Formula I above, usually combined with a pharmaceutical carrier, in an amount sufficient to produce anti-arthritic activity. The active medicament will be administered in a dosage unit, preferably in an amount of from about 1 mg. to about 25 mg., calculated on gold content. The route of administration may be orally or parenterally, the oral route being preferred. Advantageously equal doses will be administered one or two times daily with the daily dosage regimen being from about 1 mg. to about 50 mg., calculated on gold content. When the method described above is carried out anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of Formula I and their incorporation into pharmaceutical compositions of this invention, and as such are not to be considered as limiting the invention set forth in the claims appended hereto.

PREPARATIONS

Triethylphosphinegold chloride

A solution of 10.0 g. (0.08 mole) of thiodiglycol in 25 ml. of ethanol is mixed with a solution of 15.76 g. (0.04 mole) of gold acid chloride trihydrate in 75 ml. of distilled water. When the bright orange-yellow solution is almost colorless, it is cooled to below —5° C. and an equally cold solution of 5.0 g. (0.0425 mole) of triethylphosphine in 25 ml. of ethanol is added dropwise to the stirred solution. After the addition is complete, the cooled mixture is stirred for ½ hour. Solid that separates is removed and the filtrate is concentrated to about 30 ml. to yield a second crop. The combined solid is washed with aqueous-ethanol (2:1) and recrystallized from ethanol by adding water to the cloud point. The product is obtained as white needles, M.P. 85–86° C.

Triisopropylphosphinegold chloride

A mixture of 11.82 g. (0.03 mole) of gold acid chloride trihydrate and 7.9 g. (0.065 mole) of thiodiglycol in 100 ml. of aqueous ethanol (3:2) is stirred until the color of auric gold disappears. The almost colorless solution is cooled below —5° C. and an equally cold solution of 5.6 g. (0.035 mole) of triisopropylphosphine in 20 ml. of ethanol is added dropwise. The volume of the final reaction mixture is increased to 250 ml. with aqueous ethanol (1:1) in order to maintain a fluid mixture. After the addition is complete, the mixture is stirred in the cold for 45 minutes. The solid is removed by filtration, washed first with alcohol-water (1–2) then with water and dried. It is redissolved by suspending in ethanol and adding sufficient methylene chloride for solution. The cloudy solution is filtered from suspended gold and the filtrate concentrated until crystallization. There is obtained white crystals, M.P. 184–6° C.

Trimethylphosphinegold chloride

A solution of 2.44 g. (0.02 mole) of thioglycol in 15 ml. of methanol is mixed with a solution of 3.98 g. (0.01 mole) of gold acid chloride trihydrate in 25 ml. distilled water. When the orange-yellow solution becomes almost colorless, it is cooled to —15° C. and an equally cold solution of 760 mg. (0.01 mole) of trimethylphosphine in 10 ml. of methanol is added dropwise to the stirred solution. After the addition, the cooled mixture is stirred for one-half hour. The product is filtered off and the filtrate concentrated under reduced pressure to yield a second crop. The combined product is washed with cold aqueous methanol (2:1) and water, M.P. 228–229° C.

By following procedures outlined in J. Chem. Soc. 1828 (1937) trialkylphosphinegold iodide complexes are prepared, for example triethylphosphinegold iodide. Similarly, by following procedures outlined in J. Chem. Soc., 1235 (1940) trialkylphosphinegold bromides are prepared, for example triethylphosphinegold bromide and trimethylphosphinegold bromide.

Trimethylphosphitegold chloride

Gold acid chloride trihydrate (4.0 g.) is reduced to aurous chloride with 2.44 g. of thiodiglycol in aqueous-methanol (1:2) solution. The resulting solution is cooled to below —5° C. and an equally cold solution of 1.5 g. of trimethylphosphite in 10 ml. of methanol is added dropwise, with stirring under nitrogen. The reaction mixture is stirred for 30 minutes, filtered and the solid is washed with cold aqueous methanol and dried. The product is dissolved in 5 ml. of chloroform, diluted with 10 ml. of methanol and filtered through charcoal. The filtrate is concentrated under reduced pressure, cooled and diluted with ice-water to precipitate the product, M.P. 99–100° C.

Triethylphosphitegold chloride

Gold acid chloride trihydrate (5.9 g., 0.015 m.) is reduced to aurous chloride with thiodiglycol (3.7 g., 0.03 m.) in aqueous ethanol (1:2) solution. The solution is cooled to —10° C. and an equally cold solution of 3.72 g. (0.02 m.) of triethylphosphite in 20 ml. of ethanol is added, dropwise with stirring. The temperature is maintained at —10° C. and stirring is continued for 30 minutes. The ethanol is removed from the reaction mixture under reduced pressure without heating. The aqueous residue is extracted with methylene chloride and the dried extract is evaporated under reduced pressure. The crude product is purified by chromatography over a silica column to give an oil.

Triphenylphosphinegold chloride

Gold acid chloride trihydrate (4.0 g., 0.01 m.) is reduced to aurous chloride with thiodiglycol in 1:2 aqueous ethanol. After cooling this solution in an ice-bath, a cold solution of 2.62 g. (0.01 m.) of triphenylphosphine in a minimum amount of ethanol is added with stirring. The reaction mixture is stirred for about 30 minutes, filtered and the product washed with cold aqueous alcohol, then ice-water and dried, M.P. 242–243° C.

EXAMPLE 1

To a solution of 5.25 g. (0.015 m.) of triethylphosphinegold chloride in 60 ml. of absolute ethanol is added 1.14 g. (.015 m.) of thiourea and the solution is refluxed for 45 minutes. The reaction mixture is evaporated to dryness and the residue is recrystallized from ethanol to give S-(triethylphosphinoaurous)-thiouronium chloride, M.P. 144–145° C.

Similarly, reaction of N-methylthiourea as described above gives the corresponding S-(triethylphosphinoaurous)-N-methylthiouronium chloride.

EXAMPLE 2

To a solution of 5.25 g. (0.015 m.) of triethylphosphinegold chloride in 60 ml. of absolute ethanol is added 1.37 g. (0.015 m.) of thiosemicarbazide and the solution is refluxed for 45 minutes. The reaction mixture is evaporated to dryness and the residue is treated with benzene to crystallize the product, N-amino-S-(triethylphosphinoaurous)-thiouronium chloride, M.P. 117–119° C.

Following the above described procedure, reaction of 4-methylthiosemicarbazide yields N - amino - N'-methyl-S-(triethylphosphinoaurous)-thiouronium chloride.

Following the procedures described above, equimolar amounts of either a thiourea or thiosemicarbazide and the phosphines or phosphites prepared in the Preparations above are reacted to give the corresponding S-(phosphino- or phosphitoaurous)-thiouronium halides as defined by Formula I.

EXAMPLE 3

| Ingredients: | Mg./tablet |
| --- | --- |
| S - (triethylphosphinoaurous) - thiouronium chloride | 5 |
| Calcium sulfate, dihydrate | 150 |
| Sucrose | 25 |
| Starch | 15 |
| Talc | 5 |
| Stearic acid | 3 |

The sucrose, calcium sulfate and S-triethylphosphinoaurous)-thiouronium chloride are thoroughly mixed and granulated with hot 10% gelatin solution. The wetted mass is passed through a #6 mesh screen directly onto drying trays. The granules are dried at 120° F. and passed through a #20 mesh screen, mixed with the starch, talc and stearic acid, and compressed into tablets.

EXAMPLE 4

| Ingredients: | Mg./capsule |
|---|---|
| N - amino - S-(triethylphosphinoaurous)-thiouronium chloride | 10 |
| Magnesium stearate | 5 |
| Lactose | 400 |

The above ingredients are screened through a #40 mesh screen, mixed and filled into #0 hard gelatin capsules.

What is claimed is:

1. A tablet or capsule pharmaceutical composition having anti-arthritic activity, in dosage unit form for oral administration, comprising a pharmaceutical carrier and an effective, nontoxic amount of an S-(phosphino- or phosphitoaurous)-thiouronium halide of the formula:

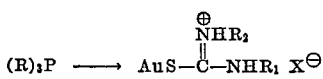

in which:

R is lower alkyl, phenyl, lower alkoxy or phenoxy, said lower alkyl and lower alkoxy being straight or branched chain of from 1 to 3 carbon atoms;
$R_1$ is hydrogen or amino;
$R_2$ is hydrogen or methyl; and
X is chloro, bromo or iodo.

2. A pharmaceutical composition according to claim 1 in which X is chloro.

3. A pharmaceutical composition according to claim 2 in which $R_2$ is hydrogen.

4. A pharmaceutical composition according to claim 3 in which R is lower alkyl.

5. A pharmaceutical composition according to claim 4 in which R is ethyl.

6. A pharmaceutical composition according to claim 5 in which $R_1$ is hydrogen.

7. A pharmaceutical composition according to claim 5 in which $R_1$ is amino.

8. The method of producing anti-arthritic activity which comprises administering orally to an animal in need of said activity in an amount sufficient to produce said anti-arthritic activity an S-(phosphino- or phosphitoaurous)-thiouronium halide of the formula:

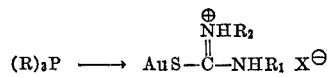

in which:

R is lower alkyl, phenyl, lower alkoxy or phenoxy, said lower alkyl and lower alkoxy being straight or branched chain of from 1 to 3 carbon atoms;
$R_1$ is hydrogen or amino;
$R_2$ is hydrogen or methyl; and
X is chloro, bromo or iodo.

9. The method according to claim 8 in which X is chloro.

10. The method according to claim 9 in which $R_2$ is hydrogen.

11. The method according to claim 10 in which R is lower alkyl.

12. The method according to claim 11 in which R is ethyl.

13. The method according to claim 12 in which $R_1$ is hydrogen.

14. The method according to claim 12 in which $R_1$ is amino.

15. The pharmaceutical composition of claim 1 in which the active medicament is present in an amount of from 1 mg. to about 25 mg., calculated on gold content, per dosage unit.

16. The method of claim 8 in which the active medicament is administered in a dosage unit in an amount of from 1 mg. to about 25 mg., calculated on gold content.

17. The method of claim 8 in which the active medicament is administeded in a daily dosage regimen of from 1 mg. to about 50 mg., calculated on gold content.

References Cited

Australian J. Chem. 19 (1966).
Chem. and Eng. News, pp. 46–53 (Aug. 12, 1968).

STANLEY J. FRIEDMAN, Primary Examiner

U.S. Cl. X.R.
424—290